Jan. 18, 1938. M. ZEH Re. 20,625

TONE ARM FOR ELECTRIC PHONOGRAPHS

Original Filed Feb. 17, 1932

Inventor:
Martin Zeh,
by Charles W. Mullen
His Attorney.

Reissued Jan. 18, 1938

Re. 20,625

UNITED STATES PATENT OFFICE 20,625

TONE ARM FOR ELECTRIC PHONOGRAPHS

Martin Zeh, Friedenau, Berlin, Germany, assignor to General Electric Company, a corporation of New York Original No. 1,976,470, dated October 9, 1934, Serial No. 593,602, February 17, 1932. Application for reissue October 6, 1936, Serial No. 104,344. In Germany February 27, 1931

4 Claims. (Cl. 179—100.4)

Figure 1:
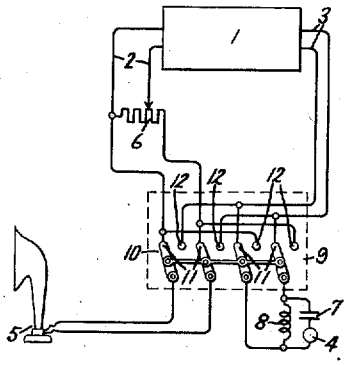

My invention relates to tone-arms for electric phonographs adapted to both the recording and the reproducing of sound vibrations by means of a recorder and reproducer unit and an amplifier, particularly the amplifier of a radio receiver, the loud-speaker of the radio receiver being utilized also as a microphone.

Radio receivers and electric phonographs are known which are so arranged that by means of separate switches or by means of a single rotary switch the apparatus may be connected to produce the following results:

The reproduction of radio programs by means of a loud speaker,

The recording of speech or music on sound discs,

The recording of radio programs on sound discs,

The reproduction of radio programs which have been recorded on sound discs,

The amplified reproduction of announcements.

My present invention is directed to a tone-arm for electric phonographs of such character that it is possible to convert, in a simple manner, existing electric phonographs arranged only for sound reproduction into apparatus capable of producing the several results above set forth, by providing the existing phonographs with the tone-arm constructed in accordance with my invention, the required current conducting and switching means being simple and reliable in operation. In accordance with my invention, I provide for the electric phonograph a tone-arm resembling the usual tone-arm in appearance but in the interior of which is mounted a switching device which is adapted, in combination with conductors leading to the loud speaker and to the input circuits of the amplifier, for example the amplifier system of a radio receiver, to connect the apparatus either for the recording or reproducing of sound as desired. On the outer wall of the tone-arm is mounted a switching element or rotatable knob for manual operation.

The supply conductors for the input and output circuits of the amplifier are preferably connected to amplifier tube sockets already comprised in the amplifier structure, and to these sockets, in case the amplifying apparatus of the radio receiver arranged for sound reproduction from a phonograph disc is used, the sockets for the sound box or the loud speaker correspond. The loud-speaker, which may be used also as a microphone, or the connecting plug of the loud speaker, is connected in accordance with the invention to sockets which are themselves connected to corresponding terminals of the switching device and are attached either to the phonograph casing or by means of a socket or mounting member to the stranded cable which contains the conductors leading to the switching device.

Preferably the sound volume adjustment means for the recorder and reproducer unit or sound box, together with necessary elements for coupling or for adjusting the sound box or the loud speaker, is mounted within the tone arm, especially within the head portion thereof. Such arrangement of parts is preferable not only for constructional reasons, but also because thereby the switching device, the loud-speaker regulator, the required coupling elements and a considerable portion of the conductors are electrically shielded.

The switching device consists preferably of one or more groups or sets of springs which may be switched into and out of contact by a handle or knob mounted on the tone-arm.

The weight of the usual sound box intended only for the reproduction of sound is much too small to cause sufficient pressure of the needle sound the phonograph plate for the recording of sound, i. e., for the forming of the sound groove in the record. It is therefore essential to load the sound box during the recording operation. In accordance with my invention, simultaneously with the setting into operative position of the loading device the handle of the electrical switching device, or of an element connected therewith, is operated.

My invention will be better understood from the following description when considered in connection with the accompanying drawing and its scope will be pointed out in the appended claims.

Figure 2:
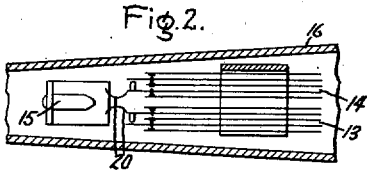
Figure 3:
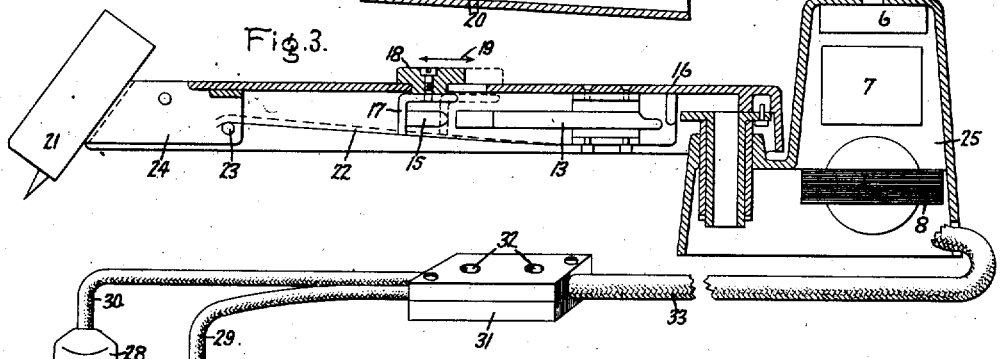
Figure 4:
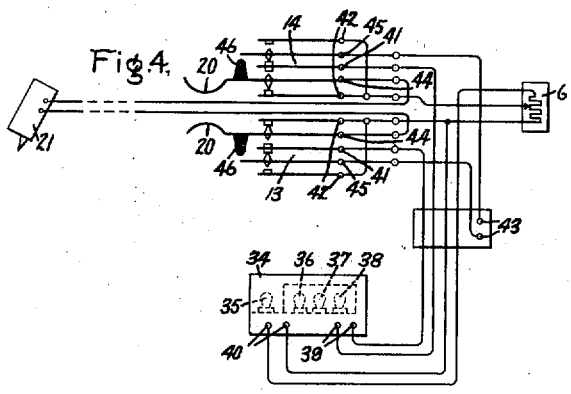

Referring to the drawing, Fig. 1 illustrates diagrammatically a sound reproducing and recording apparatus embodying my invention; Fig. 2 is a fragmental sectional view of a tone-arm containing a switching device in accordance with my invention; Fig. 3 is a cross sectional view of a tone-arm in accordance with my invention; and Fig. 4 is a partially diagrammatic view showing sound-box, switch and amplifier connections of a sound reproducing and recording system embodying my invention.

Fig. 1 illustrates diagrammatically the change of connection of an electric phonograph sound-box which for the purpose of reproducing sound is ordinarily connected through an amplifier to a loud-speaker, which will enable the sound-box to record sound or similar vibrations. During the reproduction of sound the sound-box must be connected to the input circuit of the amplifier and the loud-speaker to the output circuit of the amplifier. But, for the purpose of recording sound, the loud-speaker, which then functions as a microphone, must be connected to the input circuit of the amplifier, and the sound-box, which then serves as a recording tool, to the output circuit of the amplifier.

In Fig. 1 the numeral 1 represents an amplifier having input terminals 2 and output terminals 3, the numeral 4 an electric phonograph sound-box, the numeral 5 a loud speaker, and the numeral 6 an adjustment means by which the amplitude of the impulses impressed on the input of the amplifier 1 may be varied. In order to couple the sound-box 4 with the input and output circuits of the amplifier 1 a condenser 7 is connected in series with one of the sound-box leads and a choke coil 8 is connected in parallel to the leads. The numeral 9 represents a switching device by means of which the apparatus may be connected either for the recording or for the reproduction of sound. The switch device 9 is so arranged that the four switch blades 10 bear on the four contacts 11 when recording sound, and on the four contacts 12 when reproducing sound.

In order to switch from the recording to the reproducing position and vice-versa a jack arrangement may be used which is adapted to be moved into the required positions by means of a plug. As shown in Figs. 2 and 3 the jack or multiple spring contact device, which consists of two groups of springs 13, 14 and the plug or spreading pin 15, is mounted in the interior of the tone-arm 16. The plug 15 is connected through a bent member 17 with a control knob 18 which is adjustable on the tone-arm and may be moved in the direction of the arrow 19 toward the right or left. The position of the control knob 18 shown in full lines corresponds to the position of sound recording, and the position indicated by dotted lines to the position of sound reproducing. In the latter position the springs 20 of the jack are pressed apart by the plug or spreading pin 15 and the springs of the groups 13, 14 are thus moved into the desired position for sound reproducing.

Simultaneously with the switching over to the reproducing position the sound box, represented by the numeral 21 in Fig. 3, is loaded by means of the switching knob 18 operating the bent piece 17 connected therewith. For the purpose of loading the tone-arm a spring 22 is fastened thereto, this latter spring, in case the apparatus is connected for reproducing sound, assuming the position indicated by dotted lines in Fig. 3. In case, however, the apparatus is connected for recording sound the spring 22 is forced by the bent member 17 into the position shown in full lines. The spring 22 then exerts a pressure upon a pin 23 or the like connected with the linking member 24 of the sound-box 21.

In the head 25 of the tone-arm 16 are mounted the choke coil 8, the condenser 7, and the amplitude adjusting means 6 which is adjustable by means of a rotatable knob 26. The contact springs 13, 14 are connected to the input circuit of the amplifier, for example by connection to the phonograph terminals of a radio receiver, and to the output circuit of the amplifier, for example by connection to the loud speaker terminals when a radio receiver is employed. The connecting of the switching device to the input circuit of the amplifying apparatus is effected by the two-pin plug 27 and the connection to the output circuit by the plug 28. From plugs 27 and 28 two conductor cables 29 and 30 lead to the socket member 31, which is provided with two plug sockets 32 for the loud-speaker connection cord or cable. From the socket member 31, which is preferably mounted on the casing of the phonograph or on the casing of the amplifier or of the radio receiver, a stranded connection cable 33 containing the six required conductors leads through the tone arm 16 to the elements 6, 7, 8, 13 and 14.

The required terminals and conductors are represented schematically in Fig. 4. In the latter figure for the sake of clearness the condenser 7 and choke coil 8 are not shown. In place of the amplifier 1 shown in Fig. 1, in Fig. 4 a four tube radio receiver 34 is shown comprising a high frequency amplifying tube 35, a rectifying tube 36 and two low frequency amplifying tubes 37, 38. The terminals 39 represent the output terminals of the receiver and to these terminals the loud speaker is normally connected. In the arrangement shown in Fig. 4 the rectifying tube 36 is employed for amplification in the well known manner for the reproduction either of broadcast programs or of sound from a phonograph record. The numeral 40 represents the terminals or plug sockets which are usually provided in such apparatus for the connection of the sound-box leads. In like apparatus the arrangement is usually such that when the sound-box connections are inserted at 40 the high-frequency amplifying stage 35 automatically becomes inoperative. In the present case, shown in Fig. 4, the terminals or sockets 40 and 39 are to be regarded respectively as the input and output terminals of the amplifying device, which is indicated by dotted lines, comprising the tubes 36 to 38. Terminals 39 and 40 may be connected with the contact springs of the jacks 13, 14 in the manner illustrated in Fig. 4, terminals 39 being connected to contact springs 41 and terminals 40 to springs 42. The loud-speaker is connected to the sockets 43 which correspond to the sockets 32 shown in Fig. 3. The conductors located within the tone-arm 16 and leading to the winding of the sound-box 21 are connected at 44 and the conductors leading from the sockets 43 are connected at 45.

When the contact springs of jacks 13, 14 are in the position shown in Fig. 4 the loud speaker is connected with the output circuit of the amplifier and the sound-box with the input circuit of the amplifier. Under these conditions the apparatus is connected for the reproduction of sound records. If, however, the springs 20 are spread apart by means of the plug or spreading pin 15 the contact springs 44 and 45 are then, through the insulated studs or pins 46, brought into such a position that the loud speaker is connected with the input circuit of the amplifier and the sound-box with the output circuit of the amplifier. The apparatus is then connected for the recording of sound vibrations or the like. In the case of the apparatus shown in Fig. 4 as distinguished from that shown in Figs. 2 and 3 the switching arrangement is such that the apparatus is connected for sound recording when the springs 20 are pressed apart, and for the reproduction of sound from records when the springs are permitted to approach each other.

The switching devices, illustrated herein as jacks 13, 14, may be formed and arranged in many different ways. Instead of the switching means shown herein, or similar switching means, a suitable rotatable switch may be provided. It is essential, however, that the switching or circuit control means and the tone-arm constitute a unit, whereby an apparatus such as a usual electric phonograph may produce the desired results merely by providing the phonograph with the tone-arm unit in accordance with my invention.

It is obvious that the switching or control device combined with the tone-arm may be constructed in such a manner as to perform other switching or control operations required for the apparatus. In the embodiment of the invention described herein broadcast programs may be recorded on phonograph records merely by withdrawing plug 27 from the corresponding sockets of the radio receiver and by setting the knob 18 in the position for sound recording. The broadcast signal then passes from the output circuit 39 of the receiver to the winding of the sound-box 21.

For many purposes, for example for use of the apparatus as a dictation device, it is preferable to provide a special microphone for the reception of speech, preferably in such a manner that signals will be impressed from the microphone upon the input circuit of the amplifier as well as upon the loud-speaker. The switching or control arrangements of the apparatus may be suitably changed and extended for this purpose. The microphone may be connected to the apparatus by means of the same mounting which serves for the connection of the loud speaker. A simpler connection means is provided if the microphone plugs are inserted in the loud-speaker sockets, after the loud-speaker plugs have been withdrawn and the apparatus is connected for sound recording.

The invention is in general adapted to rendering sound reproducing apparatus readily convertible into sound recording apparatus. The invention is especially useful when applied to apparatus by means of which messages, statements, questions, or the like are to be recorded and immediately reproduced at the place of recording or dispatched in phonograph record form by post in place of letters or the like, thereafter to be reproduced by the recipient by means of the combined radio-phonograph apparatus. The phonograph discs or records employed for the latter purpose are preferably such that after the sound record is made the discs are suitable for the reproduction of sound without special or further treatment.

What I claim as new and desire to secure by Letters Patent of the United States is:

1. In electric phonograph apparatus comprising a sound-box, an amplifier and a microphone device, a hollow tone-arm structure, a supporting head for said tone-arm structure, switch means to connect said apparatus for sound recording or for sound reproduction, and circuit coupling means associated with said sound-box and microphone device, said switch means being mounted within said tone-arm structure and said coupling means including elements mounted within said tone-arm supporting head, whereby space otherwise wasted within said hollow tone-arm structure is utilized for housing a portion of said phonograph apparatus.

2. In electric phonograph apparatus comprising an amplifier and a microphonic device, a hollow tone-arm, switch means to connect said apparatus for sound recording or for sound reproduction, terminal means for said microphone device, conducting means to connect said switch means and said terminal means, and conducting means to connect said terminal means to the output circuit of said amplifier, said switch means and a portion of the first-named conducting means being mounted within said hollow tone-arm whereby space otherwise wasted within said tone-arm is utilized for housing a portion of said phonograph apparatus.

3. In electric phonograph apparatus comprising a sound-box, an amplifier and a loud speaker, a hollow tone-arm structure, a supporting head for said tone-arm structure, switch means to connect said apparatus for sound recording or for sound reproduction, and circuit coupling means associated with said sound-box and loud speaker, said switch means being mounted within said tone-arm structure and said coupling means including elements mounted within said tone-arm supporting head, whereby space otherwise wasted within said tone-arm structure is utilized for housing that portion of said phonograph apparatus including said switch means and coupling elements.

4. In electric phonograph apparatus comprising an amplifier and a loud speaker, a hollow tone-arm, switch means to connect said apparatus for sound recording or for sound reproduction, terminal means for said loud speaker, conducting means to connect said switch means and said terminal means, and conducting means to connect said terminal means to the output circuit of said amplifier, said switch means and a portion of the first-named conducting means being mounted within said hollow tone-arm whereby space otherwise wasted within said hollow tone-arm is utilized for housing a portion of said phonograph apparatus.

MARTIN ZEH.